United States Patent
Machado

[19]

[11] Patent Number: 6,098,953
[45] Date of Patent: Aug. 8, 2000

[54] CANDLE RECYCLING ASSEMBLY

[76] Inventor: Gregg Machado, 720 Duval St., #2, Key West, Fla. 33040

[21] Appl. No.: 09/361,324

[22] Filed: Jul. 27, 1999

[51] Int. Cl.[7] ................................................ B29C 31/04
[52] U.S. Cl. .............................. 249/93; 249/94; 425/803; 431/294
[58] Field of Search .................................. 425/803, 447; 249/93; 264/239, 275, 37; 431/288, 292, 294, 126

[56] References Cited

U.S. PATENT DOCUMENTS

| | | | |
|---|---|---|---|
| 3,385,649 | 5/1968 | Hicks | 431/126 |
| 4,427,366 | 1/1984 | Moore | 431/291 |
| 4,826,428 | 5/1989 | Lam | 431/291 |
| 4,830,330 | 5/1989 | Cox et al. | 249/85 |
| 5,078,945 | 1/1992 | Byron | 264/278 |
| 5,338,169 | 8/1994 | Buckley | 425/82.1 |
| 5,693,277 | 12/1997 | Widmer | 264/153 |

*Primary Examiner*—Harold Pyon
*Assistant Examiner*—Donald H. Heckenberg
*Attorney, Agent, or Firm*—Malloy & Malloy, P.A.

[57] ABSTRACT

A mold for reforming melted wax from a lit candle into a new product, preferably but not exclusively, a new candle, having a predetermined, variable shape. The mold comprising a trough structure having a hollow interior with an open face extending along the length of the hollow interior and disposed in direct communication therewith. A holder assembly is movably mounted in overlying relation to the open face and is structured to movably and adjustably support a lit candle in a position such that the melted wax is directed through the open face into the hollow interior. The holder assembly is structured to be selectively positionable both longitudinally and laterally over the open face, to direct the passage of the melted wax through the open face into all portions of the hollow interior. A wick is anchored at opposite ends of the trough structure and exteriorly of the hollow interior such that the wick extends through the hollow interior and is surrounded by the reformed melted wax which, when hardened, defines the new candle that can be lit from the same flame as the lit candle. Interconnected portions of the trough structure are removable from one another so as to facilitate removal of the newly formed candle as well as allowing for variable adjustment in the dimension of the candle being formed.

26 Claims, 2 Drawing Sheets

CANDLE RECYCLING ASSEMBLY

BACKGROUND OF THE INVENTION

1. Field of the Invention

This invention relates to an assembly designed to recycle melted wax, produced by at least one but preferably a plurality of different candles, wherein a mold in the form of an at least partially adjustable trough structure receives the melted wax from the plurality of candles and reforms the wax into a product having a predetermined shape which is preferably, but not necessarily, a candle, and which thereby provides a new light source to be lit in order to maintain continuous illumination.

2. Description of the Related Art

It is of course recognized that the use of candles, as a primary source of light, has been known for thousands of years. With the advent of the electric light bulb the extensive use of candles as a practical, utilitarian device has diminished. However, candles have enjoyed continued popularity as a decorative item. As such, decorative candles are now manufactured and commercially available in a variety of different colors, sizes, configurations, etc. and may also be formed from materials incorporating a variety of different fragrances, which emanate from the candle while it is being burned.

The earliest method of manufacturing candles, when candles were primarily used for the generation of light, involved repeated dipping of candle wicks into molten wax to form the candle body from numerous layers of wax. Naturally, the production time associated with this method was considerable since each new layer of molten wax had to be hardened before depositing the next layer of wax on the candle body being formed. In recent years the production of more modern decorative candles having a variety of shapes, dimensions, etc. has involved the use of molds to manufacture and produce the candle into the desired configuration, size, etc. However, a number of limitations are associated with the use of molds, particularly when the molds are used for the industrial production of a large number of candles. In addition, the positioning or orientation of the wicks within the formed candle bodies presented certain problems which also had a tendency to lengthen the production time. Other methods of producing candles are directed to an "arts and crafts" type of production, wherein a relatively small number of candles are intended to be produced. Each of the candles so produced may include a variety of different, decorative features not typically found in commercially available candles, and often using specialized components. One such method includes the formation of individual wax pieces, each having a predetermined shape, wherein the finished candle is formed by connecting the individual wax pieces in a somewhat stacked array. Other methods involve the positioning of a plurality of decorative pieces within a fixed mold, having a cylindrical or other preferred shape, in a manner which enables the decorative pieces to be inserted in the wax. When the molten wax hardens and the candle is removed from the forming mold, the plurality of decorative pieces are disposed in a suspended orientation throughout the entire body of the candle.

Regardless of the method of manufacture or production of decorative type candles, especially those involving individualistic or "one of a kind" designs, the cost at which such candles are available to the consuming public is frequently very high and in some cases prohibitive. The high cost of such candles frequently results in the purchaser saving the candle for a special occasion and not utilizing candles as a decorative feature in the home or other environment as often as desired.

Based on the above, the ability to "recycle" candles would have distinct advantages in the art of making and/or using candles. The recycling or reforming of candles would lower the overall cost, as well as allow utilization and display of candles having a variety of unique decorative features on a more frequent basis. A recycling assembly capable of capturing the melted wax, over a period of time, from one or more lit candles and reforming the melted wax into a candle or other product, of predetermined but variable size, configuration and color, would represent a long needed advance in the candle making art. Such a recycling assembly would have the increased advantage of allowing the repeated or continuous use of the burning of candles in a holder assembly, which itself may be both decorative and utilitarian. Another advantage would be an elimination of the waste and disposal of the melted wax emanating from burning candles, by using the melted wax in the formation of a new candle having a variety of predetermined physical and ornamental features.

SUMMARY OF THE INVENTION

The present invention is directed towards a recycling assembly designed to capture and reform melted wax generated by at least one but preferably a plurality of candles, used successively over a period of time, into a new wax product having a predetermined dimension and configuration such as, but not limited to, a new candle, and thereby permitting continuous illumination to be achieved.

More specifically, the recycling assembly of the present invention comprises a mold comprising an adjustable trough structure having a hollow interior, the size and configuration of which is defined by an at least partially surrounding wall assembly. An open face is preferably formed in the wall assembly in direct communication with the hollow interior. The open face may be dimensioned and configured to extend along both the length and the width of the hollow interior such that substantially all portions of the hollow interior are accessible through the open face, or may be configured to be re-positionable so that ultimately all portions of the hollow interior are exposed. The wall assembly of the trough structure is defined by at least one but preferably a plurality of sidewalls disposed to define exterior surface portions of the product or candle being formed. In addition, the wall assembly includes at least one, but preferably two spaced apart end walls each disposed to define opposite ends of the hollow interior and also disposed and structured to form the opposite ends of the wax product being formed. At least one but preferably a plurality of the end walls and/or sidewalls are removably interconnected to one another. Such removable interconnection allows the positioning of the components of the wall assembly to be varied relative to one another, so as to selectively vary the dimension of the new product or candle being formed. In addition, removal of the product or candle from the hollow interior of the trough structure is greatly facilitated by the detachment of one or more of the removably interconnected end walls or sidewalls from one another upon completion of the formation of the new wax product or candle.

Another feature of the present invention is the provision of a holder assembly which is movably mounted relative to the trough structure so as to be selectively positionable both laterally and longitudinally relative to the hollow interior as well as the open face. The holder assembly is disposed in overlying relation to the open face and is structured to removably mount a lit candle thereon. The candle is of course movable relative to the open face and the hollow interior along with the holder assembly in order that the lit candle may be selectively positioned so as to direct the melted wax generated therefrom down, through the open face and into virtually all portions of the hollow interior. As a result, the hollow interior will eventually be filled with the melted wax, resulting in a newly formed product when the wax hardens, having a desired predetermined size and configuration.

While the new product being formed is preferably a candle it should be understood that the spirit and scope of the present invention is intended to include a recycling assembly capable of forming a variety of wax products other than candles. However, when it is desired to form a candle, the recycling assembly of the present invention further includes a positioning assembly including at least a first anchor member and a second anchor member each mounted exteriorly of the hollow interior and preferably at opposite ends thereof. The anchor members are structured to dispose a wick within the hollow interior, such that upon hardening of the wax, the wick will be disposed on the interior of the newly formed candle and extend outwardly from at least one end thereof.

Therefore, the present invention is directed to a recycling assembly designed to reshape or reform melted wax from at least one, but more probably a plurality of candles used in succession, wherein the newly formed product may be in form of a new candle having a plurality of decorative features all of which may be predetermined and which may include size, configuration, color, etc.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
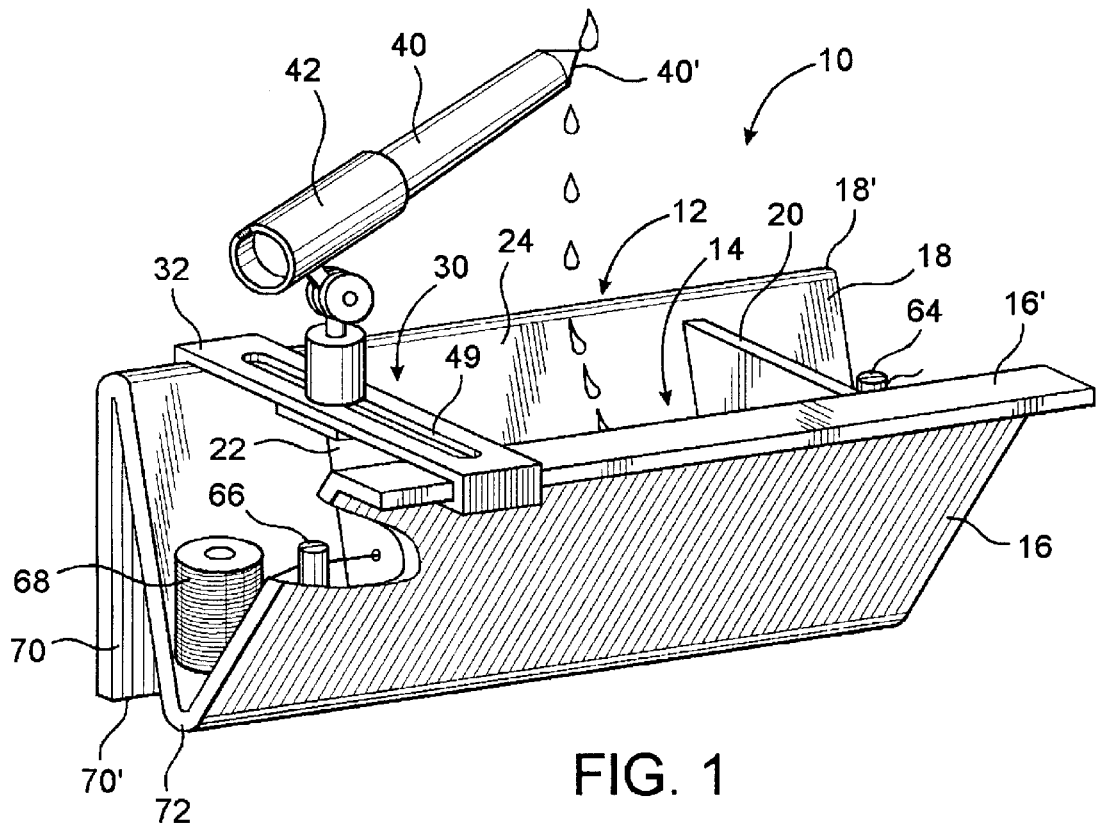
FIG. 1 is a perspective view of a recycling assembly of the present invention along with a new product, in the form of a candle, produced thereby.

As shown in the accompanying Figures, the present invention is directed to a recycling assembly generally indicated as 10, and including a mold defined by a trough structure generally indicated as 12. The trough structure 12 includes a hollow interior 14, the boundaries of which are preferably defined by a wall assembly of the trough structure 12. The wall assembly comprises at least one but preferably two sidewalls 16 and 18, preferably but not necessarily, oriented into a somewhat V-shaped configuration. The wall assembly also includes two end walls 20 and 22 one or both of which are preferably removably mounted, as shown relative to the disposition of the sidewalls 16 and 18. Accordingly, the sidewalls are positioned so as to define correspondingly positioned exterior surface portions of the candle or other product 100 formed by the recycling assembly 10. End walls 20 and 22 are disposed and structured to define and form the endmost exterior surfaces of the resulting product 100.

At least one, but preferably both, of the end walls 20 and 22 may be removably attached in a predetermined position in spaced apart relation to one another, so as to be removably interconnected between the sidewalls 16 and 18. By virtue of their removal interconnection, the space between the end walls 20 and 22 may be varied, thereby serving to vary the dimension of the hollow interior 14, as well as the dimension of the product 100 formed therein. An open face 24 is formed in the wall assembly in direct communication with the hollow interior 14. The open face 24 is dimensioned and configured to extend along at least a majority of both the length and width of the hollow interior 14 for reasons to be described in greater detail hereinafter.

Figure 3:
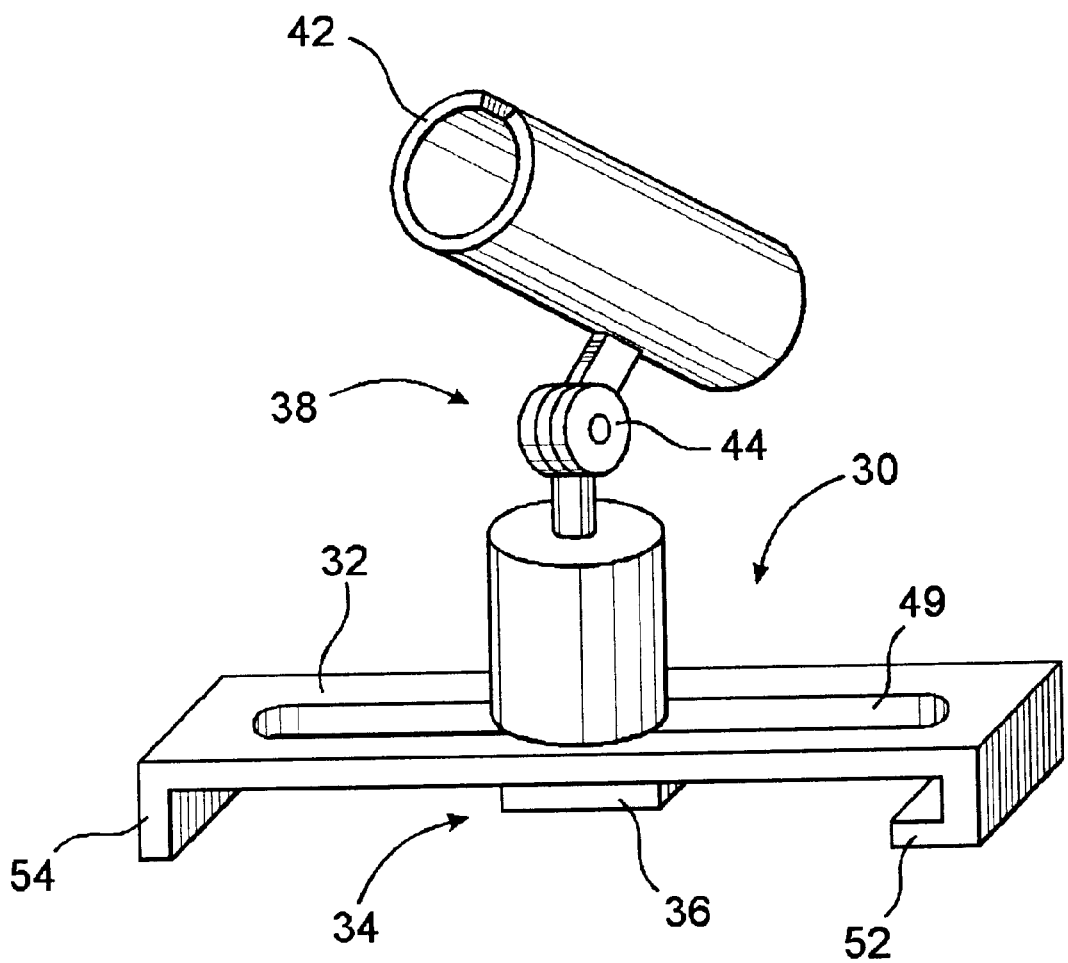
FIG. 3 is a perspective view of certain additional structural components of the present invention.

The recycling assembly of the present invention also includes a holder assembly shown in detail in FIG. 3 and generally indicated as 30. The holder assembly 30 includes an elongated base 32 of sufficient length to extend completely across the open face 24. The holder assembly 30 also includes a mounting portion generally indicated as 34, which may be more specifically defined by a mounting plate 36 disposed in supported, interconnecting relation to a candle mount 38 which may be removably secured to a lit candle 40. The candle mount 38 preferably includes an open annulus 42 which may be adjusted so as to removably support any one of a plurality of candles 40 of varying dimension and configuration on the base 32 of the holder assembly 30. Further, the candle mount 38 has a coupling member 44 disposed and structured to vary the angular orientation of the annulus 42 and therefore the angular orientation or position of the lit candle 40, relative to the open face 24 as well as the hollow interior 14. Adjustment of the coupling member 44 thereby serves to compensate for the different heights of the candles which may be connected to the candle mount 38, by varying the height or distance of the distal end 40' of candle 40 relative to the open face 24. Therefore, a candle 40, regardless of its length, is properly positioned to direct the melted wax 100' from the distal end 40' into the hollow interior 14, through the open face 24. The mounting plate 36 as well as the candle mount 38 are also preferably movable and thereby selectively positionable along the length of the base 32 by virtue of the sliding interconnection between the plate 36 and the candle mount 38 through the elongated slot 49.

Figure 2:
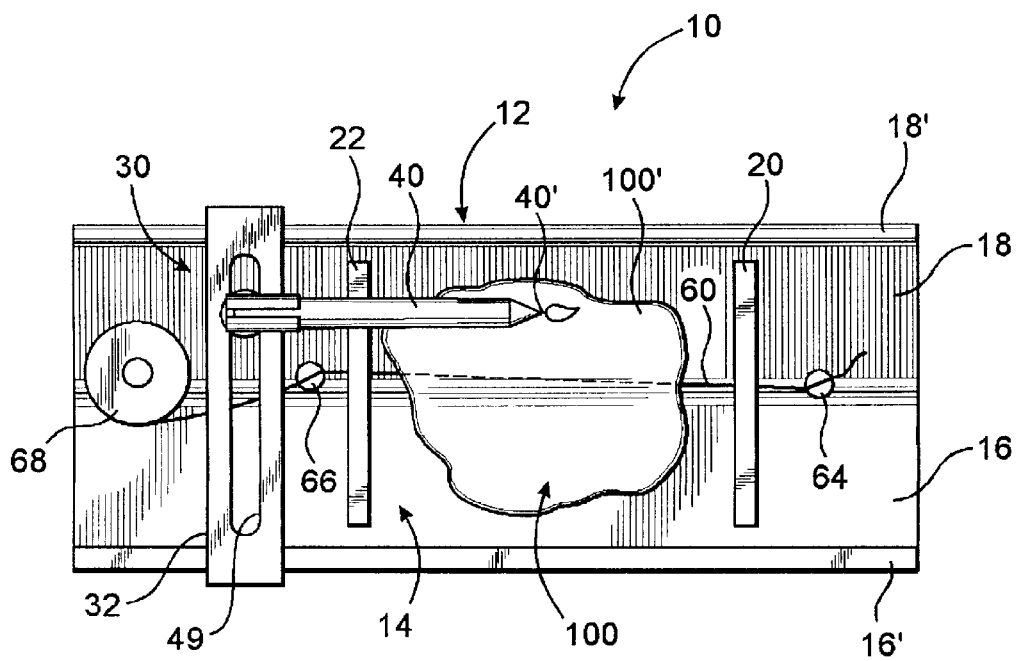
FIG. 2 is a top perspective view of an embodiment of FIG. 1.

With reference to FIGS. 1 and 2 the opposite ends of the base 32 are specifically structured and configured to slidingly engage the upper peripheral ends or edges as at 16' and 18' and the sidewalls 16 and 18. More specifically, an elongated track or recess may be formed in one of the longitudinal peripheral ends or edges 16' in order to slidingly receive an inwardly directed projection 52. The opposite end of the base 32 may include a retaining member 54 serving to stabilize the base 32. The base 32 is thereby movably supported in overlying relation to the open face 24 of the trough structure 12 in a stable manner regardless of the annular orientation or position of the candle 40 in over hanging relation to the open face 24. Therefore, as set forth above, the base 32 of the holder assembly 30 is designed to move along the length of the hollow interior 14 and open face 24. Also the mounting assembly, including the candle mount 38, is designed to travel with the base 32 and at the same time move along the length of the base 32. This "universal type" movement will allow the selective positioning of the candle 40, and in particular the lit end 40' in overlying relation with virtually all areas of the hollow interior 14, thereby enabling the melted wax 100' to be dispersed substantially equally throughout the interior 14 as the melted wax passes through the open face 24.

As also shown in the accompanying drawing and as set forth above, the product 100 being formed by re-shaping the melted wax 100' from candle 40 is preferably but not necessarily in the form of a new candle as shown in FIG. 2. When it is desired to form a new candle 100, a wick 60 is disposed in a somewhat taut, preferably linear orientation within the hollow interior 14 in a position to facilitate it being surrounded by the wax 100' captured within the hollow interior 14 as it passes through the open face 24. Therefore, the recycling assembly of the present invention includes a positioning assembly including a first anchor member 64 and a second anchor member 66 disposed substantially adjacent opposite ends of the trough structure and disposed exteriorly of the hollow interior 14. In the embodiment shown in FIGS. 1 and 2, the first and second anchor members 64 and 66 are in the form of upstanding posts but the anchor members could assume a variety of other equivalent structures and still be within the intended spirit and scope of the present invention. At least one of the first and second anchor members 64 and 66 may have a supply of the wick material 60 mounted thereon in the form of a spool 68 or the like. The other anchor member as at 64 has one end of the wick 60 tied thereto in order that the wick 60 forms the somewhat taut orientation through the length of the hollow interior 14, as set forth above.

With primary reference to FIG. 1, another structural feature of the present invention includes a stabilizing member 70, which extends outwardly from at least one of the sidewalls 18 and engages a supporting surface on which the recycling assembly 10 is mounted. The lower most end of 70' of the stabilizing member 70 engages the support surface as does the spaced apart junction 72, defined by the interconnection of the sidewalls 16 and 18.

It should be further emphasized that while the sidewalls 16 and 18 are formed or interconnected into somewhat of a V-shaped configuration, other configurations of the formed product 100 could be easily accomplished through the provision of a single sidewall member or alternatively, a plurality of sidewalls collectively disposed and interconnected to define a variety of different configurations. In the preferred V-shaped configuration, however, once a new candle is molded, the two side walls 16 and 18 can be generally pulled apart from one another so as to result in the molded product essentially "popping" out of the trough structure 12.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A recycling assembly designed to reform melted wax from a lit candle into a product of predetermined shape, said assembly comprising:
   a) a mold comprising a trough structure comprising a hollow interior and an open face, said trough structure further comprising a wall assembly disposed in at least partially surrounding relation to said hollow interior and defining the boundaries thereof,
   b) a holder assembly mounted in overlying relation to said mold and connected in supporting relation to the lit candle, and
   c) said holder assembly moveable relative to said mold so as to selectively position the lit candle in overlying relation to different portions of said hollow interior and direct passage of the melted wax through said open face.

2. An assembly as recited in claim 1 wherein said wall assembly is disposed to at least partially define the predetermined shape; said holder assembly comprising a base movably interconnected to said wall assembly and positionable along a length of said open face.

3. An assembly as recited in claim 1 wherein said holder assembly is structured to movably dispose the lit candle longitudinally along a length of said mold.

4. An assembly as recited in claim 3 wherein said holder assembly is structured to movably dispose the lit candle laterally across a width of said mold.

5. An assembly as recited in claim 1 wherein said holder assembly is structured to movably dispose the lit candle laterally across a width of said mold.

6. An assembly as recited in claim 1 wherein said hollow interior comprises a variable interior dimension and configuration.

7. An assembly as recited in claim 1 wherein said wall assembly includes a plurality of interconnected members, at least one of said interconnected members being movably disposable relative to a remainder of said trough structure.

8. An assembly as recited in claim 7 wherein said hollow interior comprises a variable dimension dependent on the disposition of said at least one interconnected member relative to the remainder of said trough structure.

9. An assembly as recited in claim 1 wherein said wall assembly comprises a plurality of sidewall members collectively disposed and configured to define outer exposed surface portions of the product being formed.

10. An assembly as recited in claim 9 wherein said wall assembly further comprises at least one end wall member interconnected to said plurality of sidewall members, said plurality of sidewall members and said end wall member collectively disposed to at least partially surround and define boundaries of said hollow interior.

11. An assembly as recited in claim 9 wherein said plurality of sidewall members and said end wall member are removably interconnected to one another to facilitate removal of the product shape from said hollow interior.

12. An assembly as recited in claim 11 wherein said end wall member is selectively disposable in a plurality of interconnected positions relative to the remainder of said wall assembly, such that the predetermined shape of the product may selectively be varied.

13. An assembly as recited in claim 9 wherein said wall assembly further comprises spaced apart end wall members interconnected to said sidewall members and disposed and configured to define opposite ends of said trough structure.

14. An assembly as recited in claim 13 wherein said open face extends along a length of said trough structure between said end wall members and in at least partially separating relation to said sidewall member.

15. An assembly as recited in claim 14 wherein said holder assembly is connected in movably supported relation on said trough structure and is selectively positionable both laterally and longitudinally relative to said open face.

16. An assembly as recited in claim 1 wherein said holder assembly further comprises a mounting assembly supportingly engaging the lit candle and movably connected to said base, said mounting assembly positionable along a length thereof.

17. An assembly as recited in claim 16 wherein said base extends transversely over said open face; said mounting assembly selectively positionable both laterally and longitudinally relative to said open face.

18. An assembly as recited in claim 17 wherein said mounting assembly is structured to vary the distance between said open face and a lit end of the lit candle.

19. An assembly as recited in claim 1 wherein said mold further comprises a positioning assembly mounted exteriorly of said hollow interior and structured and disposed to position an elongated wick within said hollow interior in a position to be at least partially surrounded by the reformed wax.

20. An assembly as recited in claim 19 wherein said positioning assembly comprises a first anchor member and a second anchor member each disposed adjacent an opposite end of said mold, exteriorly of said hollow interior; said first and said second anchor members cooperatively disposed to secure the wick therebetween.

21. An assembly as recited in claim 20 wherein at least one of said first and said second anchor members is structured to movably mount a supply of wick thereon.

22. An assembly as recited in claim 21 wherein the product comprises a candle.

23. A recycling assembly designed to reform melted wax from a lit candle into a product of predetermined shape, said assembly comprising;
  a) a mold comprising a trough structure having a hollow interior and a wall assembly disposed in at least partially surrounding relation to said hollow interior,
  b) an open face formed in said wall assembly and disposed to allow passage therethrough of the melted wax into said hollow interior,
  c) said wall assembly including spaced apart end walls at least one of which is removably connected to a remainder of said wall assembly and selectively positionable relative thereto to vary a longitudinal dimension of the product,
  d) a holder assembly movably mounted on said trough structure and supportingly connected to the lit candle, and
  e) said holder assembly selectively positionable both laterally and longitudinally relative to said open face so as to dispose a distal end of the candle in overlying relation to different portions of said hollow interior.

24. An assembly as recited in claim 23 further comprising a first anchor member and a second anchor member each disposed adjacent an opposite end of said trough structure and exteriorly of said hollow interior, said first and second anchor members cooperatively disposed to secure a wick therebetween and within said hollow interior.

25. An assembly as recited in claim 24 wherein at least one of said first and said second anchor members is structured to support a supply of wick thereon.

26. An assembly as recited in claim 24 wherein the product comprises a new candle.

* * * * *